Patented June 20, 1933

1,915,163

UNITED STATES PATENT OFFICE

MARJORIE H. MORRISON AND EDGAR H. NOLLAU, OF NEWBURGH, NEW YORK, ASSIGNORS TO E. I. DU PONT DE NEMOURS & COMPANY, OF WILMINGTON, DELAWARE, A CORPORATION OF DELAWARE

CELLULOSE NITRATE COMPOSITION AND SOLVENT MIXTURE THEREFOR

No Drawing. Application filed April 6, 1931. Serial No. 528,232.

This invention relates to coating compositions, and more particularly to cellulose nitrate coating compositions and to solvent mixtures for dispersing cellulose nitrate.

The selection of suitable solvent mixtures for producing a uniform coating composition including cellulose nitrate is dependent on a number of factors, of which viscosity of the final composition, cost, and actual performance of the composition and the resulting coating in use are most outstanding. Ethyl acetate-ethyl alcohol mixtures and acetone-ethyl alcohol mixtures are frequently used and are so proportioned to give a minimum viscosity to the cellulose nitrate dispersion so as to obtain the highest possible concentration of film forming components at coating consistency.

While mixtures of ethyl acetate or acetone and ethyl alcohol can be used to produce satisfactory compositions as far as quality is concerned, the provision of a cheaper solvent mixture having as satisfactory properties is highly desirable.

Heretofore, ethylene dichloride has been used in various solvent mixtures employed in low viscosity cellulose nitrate lacquers and the like, but the particular combinations and proportions used have not been entirely satisfactory, and this is particularly true in compositions comprising cellulose nitrate, oils, and pigments, adapted to be deposited on fabrics.

An object of the present invention is to provide a coating composition which is economical and highly satisfactory for general uses, as well as particularly for coating fabrics. A further object is to provide a solvent mixture for the dispersion of cellulose nitrate having the advantageous properties of the known ethyl acetate-ethyl alcohol and acetone-ethyl alcohol mixtures, but employing more economical solvent ingredients in part. Other objects of the invention will appear hereinafter.

These objects are accomplished according to the present invention by the use of a solvent mixture comprising ethyl acetate or acetone, ethyl alcohol, and ethylene dichloride for the dispersion of cellulose nitrate and, more specifically, by the use of an ethyl acetate-ethyl alcohol-ethylene dichloride mixture in the following proportions, by weight:—ethyl acetate, 20–40%; ethyl alcohol, 32–70%; ethylene dichloride, 10–28%, and by the use of an acetone, ethyl alcohol, and ethylene dichloride mixture in the following proportions, by weight:—acetone, 15–25%; alcohol, 30–75%; ethylene dichloride, 10–45%.

The viscosities of dispersions of 40–60 second cellulose nitrate in 16 ounce concentration in mixtures of ethyl acetate-ethyl alcohol-ethylene dichloride or acetone-ethyl alcohol-ethylene dichloride in the above proportions are not substantially greater than the viscosities of the same cellulose nitrate in the same concentration in the optimum mixtures of ethyl acetate-ethyl alcohol or acetone-ethyl alcohol, whereas the replacement of the ethyl acetate or acetone and alcohol in part by ethylene dichloride materially reduces the cost of these mixtures. Furthermore, the quality of a film of cellulose nitrate, oil, and pigment deposited as a coating film on a fabric base dispersed in these new mixtures is not deleteriously affected.

By 40–60 second cellulose nitrate in 16 ounce concentration is meant cellulose nitrate whose viscosity is such that when dispersed in 16 ounce concentration (12.35% by weight) in a mixture containing 40 parts by weight ethyl acetate and 60 parts by weight ethyl alcohol, 40–60 seconds are required for a 1/4" steel ball to fall ten inches through a column of jelly 1 1/2" in diameter maintained at 25° C.

To illustrate examples of the solvent mixtures of the present invention which have been found practical from the standpoint of viscosity, the following table is given:—

| Ethyl acetate | Alcohol | Ethylene dichloride | Viscosity |
|---|---|---|---|
| 34% | 66% | --- | 34 seconds |
| 39 | 47 | 14 | 45 |
| 34 | 46 | 20 | 54 |
| 30 | 55 | 15 | 50 |
| 30 | 50 | 20 | 56 |
| 28 | 45 | 27 | 64 |
| 25 | 55 | 20 | 52 |
| 25 | 50 | 25 | 62 |
| 20 | 55 | 25 | 64 |
| Acetone | | | |
| 25% | 50 | 25 | 34 |
| 25 | 42 | 33 | 46 |
| 25 | 30 | 45 | 54 |
| 20 | 50 | 30 | 45 |
| 20 | 45 | 35 | 47 |
| 20 | 38 | 42 | 50 |
| 15 | 50 | 35 | 53 |
| 15 | 45 | 40 | 60 |

While viscosities are obviously desired in the lowest range possible, it will be understood by those versed in the art that viscosities may vary over a considerable range, as in the above table, and still be entirely practical.

Examples of coating compositions containing the type of solvent mixtures coming within the scope of this invention are as follows:

*Example 1*

| | Per cent by weight |
|---|---|
| Cellulose nitrate | 11.80 |
| Raw castor oil | 18.10 |
| Ultramarine blue | 7.97 |
| Lithopone | 5.10 |
| Chrome green light | 1.10 |
| Scarlet lake | 0.14 |
| Ethyl acetate | 19.54 |
| Ethylene dichloride | 11.15 |
| Denatured alcohol | 25.10 |
| | 100.00 |

*Example 2*

| | Per cent |
|---|---|
| Recovered smokeless powder | 11.51 |
| Blown castor oil | 24.46 |
| Bone black | 4.67 |
| Barytes | 2.52 |
| Ethyl acetate | 14.21 |
| Ethylene dichloride | 8.53 |
| Denatured alcohol | 34.10 |
| | 100.00 |

In the above coating compositions a solvent mixture of acetone, ethyl alcohol, and ethylene dichloride falling within the range of proportions disclosed could be substituted for the ethyl acetate, ethyl alcohol, and ethylene dichloride used.

The solvent mixtures herein disclosed are highly useful for dispersing cellulose nitrate for various purposes, and are particularly advantageous for compositions used for coating fabrics, being as satisfactory and materially cheaper than a dispersing mixture consisting of acetone or ethyl acetate and alcohol without ethylene dichloride.

As many apparently and widely different embodiments of this invention may be made without departing from the spirit and scope thereof, it is to be understood that we do not limit ourselves to the specific embodiments thereof except as defined in the appended claims.

We claim:

1. A coating composition comprising cellulose nitrate, a vegetable oil, a pigment, and a solvent mixture consisting of, by weight, ethyl acetate 20–40%, ethyl alcohol 32–70%, and ethylene dichloride 10–28%.

2. A coating composition adapted for coating fabrics, comprising cellulose nitrate, castor oil, a pigment, and a solvent mixture consisting of, by weight, ethyl acetate 20–40%, ethyl alcohol 32–70%, and ethylene dichloride 10–28%.

In testimony whereof we affix our signatures.

MARJORIE H. MORRISON.
EDGAR H. NOLLAU.